United States Patent
Jauhar et al.

(10) Patent No.: US 11,244,106 B2
(45) Date of Patent: Feb. 8, 2022

(54) TASK TEMPLATES AND SOCIAL TASK DISCOVERY

(71) Applicant: Microsoft Technology Licensing, LLC, Redmond, WA (US)

(72) Inventors: Sujay Kumar Jauhar, Kirkland, WA (US); Nirupama Chandrasekaran, Seattle, WA (US); Elnaz Nouri, Redmond, WA (US); Mark J. Encarnacion, Bellevue, WA (US); Michael Gamon, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/502,951

(22) Filed: Jul. 3, 2019

(65) Prior Publication Data

US 2021/0004436 A1 Jan. 7, 2021

(51) Int. Cl.
*G06F 16/24* (2019.01)
*G06F 9/451* (2018.01)
*G06F 16/2457* (2019.01)
*G06F 3/0484* (2013.01)
*G06F 40/186* (2020.01)

(52) U.S. Cl.
CPC .......... *G06F 40/186* (2020.01); *G06F 3/0484* (2013.01); *G06F 9/451* (2018.02); *G06F 16/24578* (2019.01)

(58) Field of Classification Search
CPC .. G06F 40/186; G06F 9/451; G06F 16/24578; G06F 3/0484
See application file for complete search history.

(56) References Cited

U.S. PATENT DOCUMENTS 6,098,061 A * 8/2000 Gotoh ................ G06N 5/02
706/50
6,988,139 B1 * 1/2006 Jervis .................. G06F 9/5038
709/224

(Continued)

FOREIGN PATENT DOCUMENTS

EP 2819070 A1 12/2014
WO 2013040440 A1 3/2013

OTHER PUBLICATIONS

"International Search Report and Written Opinion Issued in PCT Application No. PCT/US20/034463", dated Aug. 25, 2020, 11 Pages.

(Continued)

*Primary Examiner* — Daeho D Song

(57) ABSTRACT

Aspects of the present disclosure relate to task template generation and social task discovery. In examples, a task template catalog comprises task templates, which may be automatically generated and/or user-submitted, among other examples. Task templates can be reviewed, shared, and curated within the task template catalog. A user may browse the task catalog or search the task catalog for task templates. Once the user selects a task template, a task is generated based on the task template and added to the user's task list. In some examples, aspects of a task template may be customized. For example, a task may comprise parametric or conditional subtasks, thereby enabling a user to further tailor the task template to his or her needs. Thus, the task catalog provides a starting point from which the user can author a task in a task management application.

19 Claims, 12 Drawing Sheets

(56) References Cited

U.S. PATENT DOCUMENTS

| | | | | |
|---|---|---|---|---|
| 7,467,355 | B1* | 12/2008 | Zukowski | G06Q 10/109 715/765 |
| 8,645,295 | B1* | 2/2014 | Dillard | G06Q 30/0278 706/20 |
| 8,688,691 | B2* | 4/2014 | Ahmed | G06F 16/9535 707/723 |
| 8,707,198 | B2* | 4/2014 | Jiang | G06F 3/0481 715/779 |
| 9,317,825 | B2* | 4/2016 | Defusco | G06Q 10/1093 |
| 9,378,196 | B1* | 6/2016 | Tomkins | G06F 40/174 |
| 9,607,325 | B1* | 3/2017 | Sriram | G06Q 30/0282 |
| 10,027,796 | B1 | 7/2018 | Almog et al. | |
| 10,331,681 | B1* | 6/2019 | Chen | G06Q 30/00 |
| 10,387,432 | B2* | 8/2019 | Rajan | G06F 16/24578 |
| 10,409,367 | B2* | 9/2019 | Velez-Rojas | G06N 5/02 |
| 10,585,927 | B1* | 3/2020 | Liao | G06F 16/3349 |
| 10,606,649 | B2* | 3/2020 | Baggerman | G06F 9/5027 |
| 10,620,802 | B1* | 4/2020 | Varma | G06F 40/186 |
| 2001/0011295 | A1* | 8/2001 | Kobayashi | G06Q 10/06 709/201 |
| 2001/0037287 | A1* | 11/2001 | Broadbent | G06Q 20/10 705/38 |
| 2002/0049621 | A1* | 4/2002 | Bruce | G06Q 10/06 705/7.26 |
| 2002/0161602 | A1* | 10/2002 | Dougherty | G06Q 30/0601 705/80 |
| 2003/0088536 | A1* | 5/2003 | Behnia | G06Q 40/02 |
| 2003/0135558 | A1* | 7/2003 | Bellotti | G06Q 10/107 709/206 |
| 2004/0093584 | A1* | 5/2004 | Le | G06F 9/50 717/103 |
| 2005/0021522 | A1* | 1/2005 | Herman | G06Q 10/06 |
| 2005/0097505 | A1* | 5/2005 | Gupta | G06Q 10/06 717/101 |
| 2005/0246216 | A1* | 11/2005 | Rosen, III | G06Q 10/087 705/28 |
| 2006/0173900 | A1* | 8/2006 | Dhayalan | G06Q 10/06 |
| 2007/0067145 | A1* | 3/2007 | Miller | G06Q 10/06 703/6 |
| 2007/0220505 | A1* | 9/2007 | Bukovec | G06F 8/60 717/168 |
| 2007/0234210 | A1* | 10/2007 | Bukovec | G06F 3/048 715/700 |
| 2007/0245261 | A1* | 10/2007 | Bukovec | G06Q 10/06316 715/810 |
| 2007/0266133 | A1* | 11/2007 | Bukovec | H04L 41/16 709/223 |
| 2008/0154935 | A1* | 6/2008 | Draeger | G06F 16/289 |
| 2009/0100427 | A1* | 4/2009 | Loos | G06Q 30/00 718/100 |
| 2009/0144730 | A1* | 6/2009 | Chen | G06F 8/61 717/178 |
| 2009/0157729 | A1* | 6/2009 | Herlocker | G06F 16/9535 |
| 2009/0204471 | A1* | 8/2009 | Elenbaas | G06Q 10/06 705/7.13 |
| 2009/0228442 | A1* | 9/2009 | Adams | G06F 16/951 |
| 2009/0228817 | A1* | 9/2009 | Adams | G06F 16/338 715/767 |
| 2009/0276419 | A1* | 11/2009 | Jones | G06F 16/3322 |
| 2010/0077327 | A1* | 3/2010 | Pulsipher | G06Q 10/10 715/764 |
| 2010/0185183 | A1* | 7/2010 | Alme | G16H 40/63 604/891.1 |
| 2010/0205199 | A1* | 8/2010 | Lin | G06F 16/9535 707/765 |
| 2010/0299343 | A1* | 11/2010 | Ahari | G06F 16/337 707/759 |
| 2010/0306018 | A1 | 12/2010 | Burtner et al. | |
| 2011/0010612 | A1* | 1/2011 | Thorpe | G06F 16/957 715/234 |
| 2011/0035402 | A1* | 2/2011 | Agrawal | G06F 16/955 707/769 |
| 2011/0074812 | A1* | 3/2011 | Matsumoto | G06F 16/958 345/629 |
| 2011/0126123 | A1* | 5/2011 | Reter | G06Q 10/109 715/751 |
| 2011/0283215 | A1* | 11/2011 | Dunn | G06F 9/451 715/771 |
| 2011/0302521 | A1* | 12/2011 | Jiang | G06F 16/9535 715/779 |
| 2012/0130969 | A1* | 5/2012 | Wong | G06F 16/9535 707/706 |
| 2012/0158685 | A1* | 6/2012 | White | G06F 16/9535 707/706 |
| 2012/0191577 | A1* | 7/2012 | Gonsalves | G06Q 30/06 705/27.2 |
| 2012/0278388 | A1* | 11/2012 | Kleinbart | G06Q 10/10 709/204 |
| 2012/0309363 | A1* | 12/2012 | Gruber | G06Q 10/06311 455/414.1 |
| 2013/0031032 | A1* | 1/2013 | Mehta | G06F 16/313 706/12 |
| 2013/0124278 | A1* | 5/2013 | Najm | G06Q 30/0241 705/14.11 |
| 2013/0218626 | A1* | 8/2013 | Duquette | G06Q 10/06 705/7.23 |
| 2013/0332438 | A1* | 12/2013 | Li | G06F 16/9535 707/706 |
| 2014/0013212 | A1* | 1/2014 | Von Haden | G06F 40/186 715/243 |
| 2014/0039954 | A1* | 2/2014 | Wong | G06Q 10/063118 705/7.14 |
| 2014/0188978 | A1* | 7/2014 | Ng | H04L 67/10 709/203 |
| 2014/0201131 | A1* | 7/2014 | Burman | G06F 40/10 707/608 |
| 2014/0344035 | A1* | 11/2014 | Hewett | G06Q 30/0211 705/14.13 |
| 2014/0359554 | A1 | 12/2014 | Ritter et al. | |
| 2015/0149467 | A1* | 5/2015 | Sar | G06F 16/285 707/740 |
| 2015/0185996 | A1* | 7/2015 | Brown | G06F 3/04842 715/706 |
| 2015/0278370 | A1* | 10/2015 | Stratvert | G06F 40/40 707/766 |
| 2015/0347125 | A1 | 12/2015 | High et al. | |
| 2015/0347987 | A1* | 12/2015 | Ali | G06Q 10/1097 705/7.21 |
| 2015/0356085 | A1* | 12/2015 | Panda | G06N 5/04 707/748 |
| 2016/0078141 | A1* | 3/2016 | Fang | G06F 16/9535 707/709 |
| 2016/0103599 | A1* | 4/2016 | Tang | G06F 9/4843 715/771 |
| 2016/0283199 | A1 | 9/2016 | High et al. | |
| 2016/0292603 | A1 | 10/2016 | Prajapati et al. | |
| 2016/0292807 | A1* | 10/2016 | O'Grady | G06Q 10/06398 |
| 2017/0031576 | A1* | 2/2017 | Saoji | G06Q 10/06 |
| 2017/0046431 | A1* | 2/2017 | Zitouni | G06N 20/00 |
| 2017/0091612 | A1* | 3/2017 | Gruber | G06F 40/169 |
| 2017/0098180 | A1* | 4/2017 | Chandraghatgi | G06Q 10/06311 |
| 2017/0212782 | A1* | 7/2017 | Kurian | H04L 41/0843 |
| 2017/0255627 | A1* | 9/2017 | Coll | G06F 16/248 |
| 2017/0285879 | A1* | 10/2017 | Pilkington | G06Q 10/063114 |
| 2017/0310716 | A1 | 10/2017 | Lopez et al. | |
| 2017/0364336 | A1* | 12/2017 | Khan | G06F 8/36 |
| 2018/0053127 | A1 | 2/2018 | Boileau | |
| 2018/0075008 | A1* | 3/2018 | Ganta | G06F 40/134 |
| 2018/0130007 | A1* | 5/2018 | Fowler | G06Q 10/1095 |
| 2018/0276581 | A1 | 9/2018 | Sakurai et al. | |
| 2018/0293528 | A1* | 10/2018 | Bostick | G06Q 10/06316 |
| 2018/0300424 | A1* | 10/2018 | Alok | G06F 16/951 |
| 2019/0065012 | A1 | 2/2019 | Masi | |
| 2019/0080023 | A1* | 3/2019 | Varippyreddy | G06F 16/248 |
| 2019/0121840 | A1* | 4/2019 | Abbott | G06F 16/93 |
| 2019/0130227 | A1* | 5/2019 | Blue | G06K 9/3258 |
| 2019/0235887 | A1* | 8/2019 | Hemaraj | G10L 15/22 |
| 2019/0272332 | A1 | 9/2019 | Kudssi | |

(56) References Cited

U.S. PATENT DOCUMENTS

| | | | |
|---|---|---|---|
| 2019/0324779 A1* | 10/2019 | Martin | G06F 40/40 |
| 2019/0348174 A1* | 11/2019 | Spirer | G06F 40/186 |
| 2020/0004554 A1* | 1/2020 | Murase | G06F 8/34 |
| 2020/0019771 A1 | 1/2020 | Paget et al. | |
| 2020/0020000 A1* | 1/2020 | Guy | G06F 40/56 |
| 2020/0026566 A1* | 1/2020 | Baggerman | G06F 9/50 |
| 2020/0065878 A1* | 2/2020 | Stubbs | G06Q 30/0631 |
| 2020/0097161 A1* | 3/2020 | Gonzalez | G06F 3/0482 |
| 2020/0230817 A1* | 7/2020 | Han | B25J 9/0081 |
| 2021/0004736 A1* | 1/2021 | Nouri | G06F 3/0482 |
| 2021/0049440 A1* | 2/2021 | Sim | G06F 9/453 |
| 2021/0049529 A1* | 2/2021 | White | G06F 40/279 |

OTHER PUBLICATIONS

"International Search Report and Written Opinion Issued in PCT Application No. PCT/US20/037105", dated Sep. 24, 2020, 13 Pages.

"How to capture sticky notes with Brill (Quick Demo)—YouTube", Retrieved From: https://www.youtube.com/watch?v=ud7mtlrkFCI, Aug. 6, 2019, 1 Page.

"International Search Report and Written Opinion Issued in PCT Application No. PCT/US20/037108", dated Oct. 9, 2020, 10 Pages.

"Search engine (computing)", Retrieved from: https://en.wikipedia.org/w/index.php?title=Search_engine_(computing)&oldid=904265432, Retrieved Date: Nov. 17, 2020, 3 Pages.

"International Search Report and Written Opinion Issued in PCT Application No. PCT/US2020/034465", dated Oct. 15, 2020, 17 Pages.

"Non Final Office Action Issued in U.S. Appl. No. 16/503,001", dated Apr. 28, 2021, 19 Pages.

Li, et al., "Bi-Objective Scheduling Optimization for Discrete Time/Cost Trade-Off in Projects" In Journal of Sustainability, vol. 10, Issue 8, 2018, 15 Pages.

Monghasemi, et al., "A Novel Multi Criteria Decision Making Model for Optimizing Lime-Cost-Quality Trade-Off Problems in Construction Projects", In Journal of Expert Systems with Applications 42, vol. 6, Apr. 2015, pp. 3089-3104.

Hazir, et al., "Discrete Time/Cost Trade-Off Problem: A Decomposition-Based Solution Algorithm for the Budget Version", In Journal of Computers & Operations Research, vol. 37, Issue 4, Apr. 2010, pp. 649-655.

"Non Final Office Action Issued in U.S. Appl. No. 16/542,156", dated Jun. 10, 2021, 20 Pages.

* cited by examiner

TASK TEMPLATES AND SOCIAL TASK DISCOVERY

BACKGROUND

A task management application enables users to track various tasks. However, manually creating and adding tasks to the task management application may be a barrier to using the task management application, as may be the case when a user is unfamiliar with a task and therefore does not know how to approach and define the task.

It is with respect to these and other general considerations that embodiments have been described. Also, although relatively specific problems have been discussed, it should be understood that the embodiments should not be limited to solving the specific problems identified in the background.

SUMMARY

Aspects of the present disclosure relate to task templates and social task discovery. In examples, a task template catalog is provided comprising task templates. Task templates may be automatically generated and/or user-submitted, among other examples. A user may browse the task catalog or search the task catalog for task templates (e.g., using a query, based on one or more specified categories, etc.). Once the user selects a task template, a task is generated based on the task template and added to the user's task list. Task templates can be reviewed, shared, and curated within the task template catalog.

In some examples, aspects of a task template may be customized. For example, a task may comprise parametric or conditional subtasks. Aspects of a parametric subtask may change depending on various information, such as information received from a user and/or a computing device. Similarly, one or more subtasks may be conditional on other data, such that inclusion of the subtasks in the generated task may depend on one or more conditions. Thus, task templates in the task catalog provide a starting point from which a user can author a task in a task management application.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1:
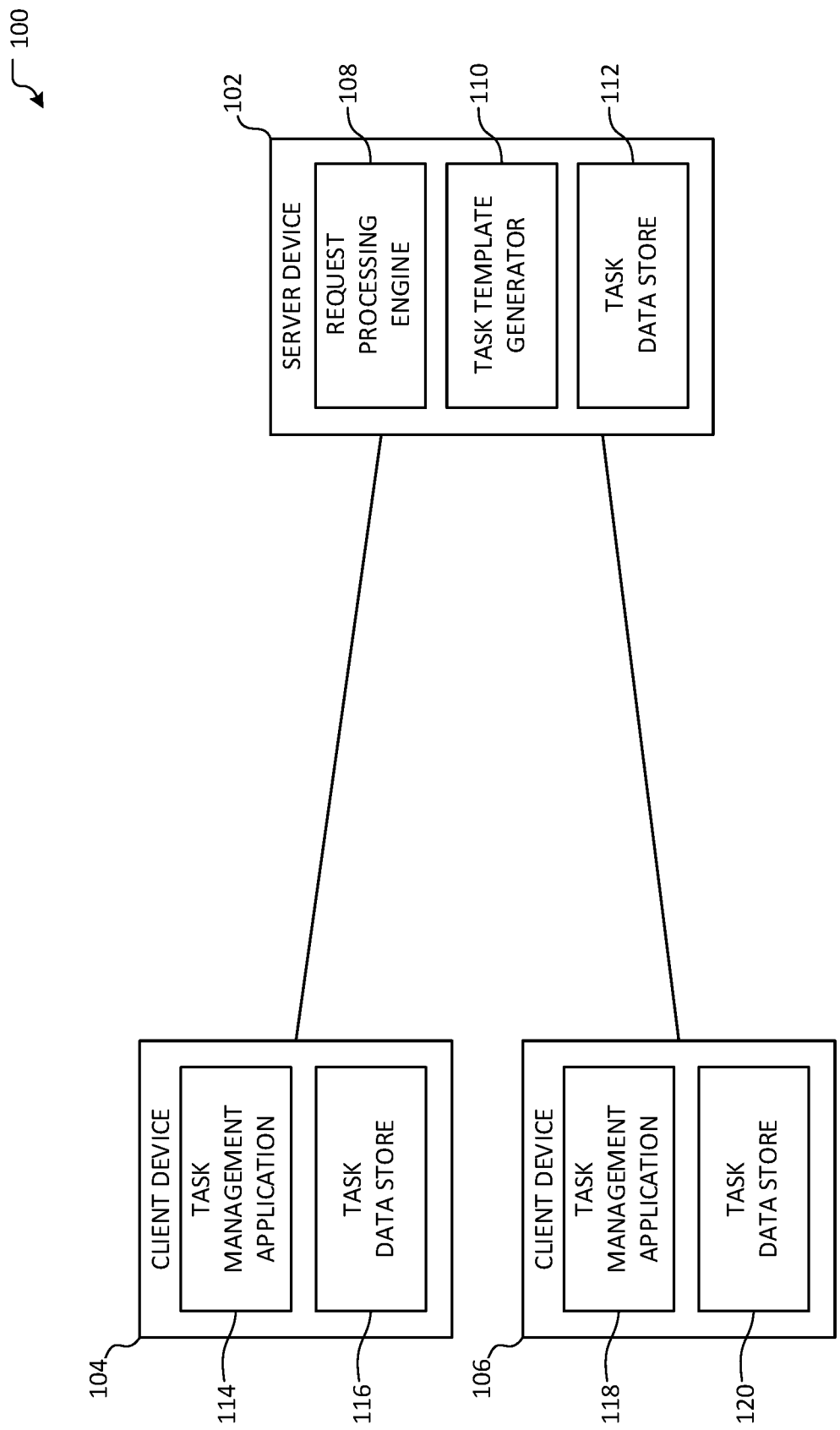
FIG. 1 illustrates an overview of an example system for automated task template generation and social task discovery.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, a software implementation, or an implementation combining software and hardware aspects. The following detailed description is therefore not to be taken in a limiting sense, and the scope of the present disclosure is defined by the appended claims and their equivalents.

A task management application provides functionality that enables a user to manage and track a task to completion. For example, a task may be comprised of a set of subtasks, have one or more associated resources, and/or have other users with which aspects of the task are associated. Thus, it is possible to view progress toward completion of the task, generate an estimated time of completion, and delegate aspects of the task to other users. However, if a user is unfamiliar with a task (e.g., has never performed such a task, is travelling to an unfamiliar location, is unaware of the resources associated with a task, etc.), such task management software is less useful and less likely to be used given that the user may not know the steps with which to create the task in the task management application.

Accordingly, aspects of the present disclosure relate to task template generation and social task discovery. In examples, a user selects a task template as at least a starting point for a task in a task management application. As an example, a task template is automatically generated from a data source (e.g., a how-to video, a bulleted list on a website, etc.). In another example, user-submitted task templates are available for a user to browse, select, and customize. In some instances, a task template catalog is provided, in which automatically generated task templates and user-submitted task templates are presented. Task templates in the catalog may be searchable, ranked (e.g., according to user reviews, relevance to a user's search query, etc.), and, in some instances, curated to highlight popular or high-quality task templates, among other examples. Thus, if a user is previously unfamiliar with a task or wishes to identify examples for how to perform a given task, the task template catalog offers a place from which the user can select or begin to customize a task template, rather than potentially needing to perform a large amount of individual research or trial and error to manually create a new task. Additionally, the utility of the task management application is increased because the user is more likely to use the task management application to manage the task as a result of the user having at least a starting point from which to define the task. By contrast, when the user must first determine aspects of the task manually, the user may instead not use the task management application or may incorrectly define the task (e.g., omitting subtasks, failing to include relevant resources to the task, misestimating task requirements, etc.).

As used herein, a task may be comprised of one or more subtasks. In some examples, one subtask is dependent on one or more other subtasks, such that the other subtasks are prerequisites for completing the subtask. In other examples, subtasks are hierarchical, wherein a subtask is further comprised of a set of other constituent subtasks. A task may be associated with a resource, wherein the resource is relevant to completing the task. Example resources include, but are not limited to, a document, a link to a website, contact information, or audio or video content, among other examples. In another example, a task is associated with one or more users, which may be responsible for overseeing or performing aspects of the task. In other examples, a task may have an associated "cost." Example costs include, but are not limited to, an estimated or actual amount of time to complete the task, an estimated or actual monetary cost associated with the task, and/or one or more inputs to perform the task (e.g., ingredients, supplies, etc.). It will be appreciated that while examples are described herein with respect to a task, such examples are similarly applicable to subtasks.

A task template is used to generate a task. As described above, a task template may be accessed from a task template catalog and may be an automatically generated task template or may be a user-submitted task template, among other examples. In some instances, a task template is parametric, wherein aspects of the task template are modified or otherwise adapted to generate a task. For example, a task template may specify it is a recipe for preparing a meal for four people, such that an indication of a different number of people may be provided in order to adapt the task template to be a task for preparing a meal for an increased or reduced amount of people. In other examples, subtasks of the task template may be dependent on one or more criteria. Example criteria include, but are not limited to, completion of another task or subtask, the availability of an input associated with the subtasks, a location associated with a computing device of the user (among other device characteristics, such as device type, hardware or software version, hardware capabilities, etc.), and/or a time, date, or season. It will be appreciated that while example criteria are described herein, any of a variety of other criteria may be used. In examples, one or more subtasks may be unordered, such that a user may select an order for the subtasks when the task is generated from the task template. In another example, an order is automatically determined (e.g., based on an evaluation of one or more costs and/or associated users, among other examples).

A user-submitted task template may be authored by a user using a task management application and/or implicitly generated based on an analysis of user behavior. For example, a user defines a set of subtasks associated with a task using the task management application. In some examples, the user performs the task, thereby completing each of the defined subtasks. Upon completion, the user is presented with the option to submit the task as a task template (e.g., to a task template catalog, according to aspects described herein). The user may indicate dependencies, form hierarchies of subtasks, and/or specify subtask criteria. In some examples, the user authors a parametric task, wherein the user indicates aspects of the task to be adapted according to one or more parametric rules. For example, a parametric rule comprises a scaling factor to adapt an estimated time and/or inputs for a subtask. As another example, a step function is used, such as where the number of people causes a reservation subtask to require two tables at a restaurant instead of one. A parametric rule may relate to information received from a user (e.g., a number of people, an amount of time available to perform a task, etc.), device characteristics, and/or information received from a remote computing device, etc. It will be appreciated that while example parametric rules are discussed, any of a variety of other rules may be used to adapt a task or subtask according to aspects described herein.

FIG. 1 illustrates an overview of an example system 100 for automated task template generation and social task discovery. As illustrated, system 100 comprises server device 102, client device 104, and client device 106. In examples, server device 102, client device 104, and client device 106 communicate using a network, such as a local area network, a wireless network, or the Internet, or any combination thereof. In an example, client device 104 and client device 106 are any of a variety of computing devices, including, but not limited to, a mobile computing device, a laptop computing device, a tablet computing device, or a desktop computing device. In other examples, server device 102 is a computing device, including, but not limited to, a virtualized computing device, a desktop computing device, or a distributed computing device. It will be appreciated that while system 100 is illustrated as comprising one server device 102 and two client devices 104 and 106, any number of devices may be used in other examples.

Client device 104 is illustrated as comprising task management application 114 and task data store 116. In examples, task management application 114 manages one or more task lists for a user of client device 104. As used herein, a task list comprises a set of tasks. In examples, the tasks are related and/or interdependent. According to aspects described herein, task management application 114 is used to author a task comprising a set of subtasks. In some instances, task management application 114 is used to browse a task template catalog (e.g., as may be provided by server device 102, as discussed in greater detail below). In other examples, a different application, such as a web browser or email application, is used to add tasks from a task template catalog to task management application 114.

In other examples, task management application 114 analyzes user behavior to implicitly generate aspects of a task template according to aspects described herein. For example, task management application 114 may identify an order in which subtasks of a task are performed in order to generate a dependency between two or more subtasks. As another example, task management application 114 may process a browsing history of a user to identify a set of actions associated with an intent. It will be appreciated that while examples of user behavior analysis are described herein, any of a variety of other analyses may be performed. Additionally, while the analysis is described as being performed by client device 104, it will be appreciated that at least a part of the analysis may be performed by another computing device, such as server device 102 and/or client device 106. For example, server device 102 may aggregate user behaviors and/or tasks from multiple users to automatically generate a task template (e.g., using task template generator 110) based on an analysis of crowd-sourced data.

Client device 104 further comprises task data store 116. Task data store 116 stores task lists and associated tasks, as are used by task management application 114. In examples, task data store 116 is stored locally to client device 104. In another example, at least a part of task data store 116 is stored remotely (e.g., by task data store 112 of server device 102), thereby enabling tasks to be synchronized among multiple devices.

Client device 106 comprises task management application 118 and task data store 120, each of which are similar to task management application 114 and task data store 116 of client device 104, respectively. In examples, client device 106 is a different type of computing device than client device 104. Additionally, it will be appreciated that client devices 104 and 106 may each be used by the same user or may be used by different users.

Server device 102 is illustrated as comprising request processing engine 108, task template generator 110, and task data store 112. In examples, server device 102 uses request processing engine 108 to provide a task template catalog that is accessed by task management application 114 and task management application 118 on client device 104 and client device 106, respectively. In other examples, the task template catalog is accessed using any of a variety of other applications, such as a web browser or from an email or other messaging application (e.g., as a result of a link sent by another user), among other examples. Request processing engine 108 may receive task templates and/or user behavior information from a task management application according to aspects described herein.

Server device 102 further comprises task template generator 110, which automatically generates task templates. For example, task template generator 110 processes a resource (e.g., a how-to video, a bulleted list on a website, etc.) to generate a task template accordingly. In another example, task template generator 110 processes user behavior information to generate a task template. In some examples, a resource is processed in combination with user behavior information. For example, task template generator 110 categorizes behavior information relating to tasks in order to aggregate behavior information relating to similar tasks. Subtasks are similarly categorized in order to identify similar subtasks among the tasks. Thus, task template generator 110 is able to identify subtasks that are more frequently incorporated by users of the task management application. In some instances, less frequent subtasks may be incorporated into a task template as optional tasks. Additionally, task template generator 110 may identify dependencies by analyzing the order in which subtasks are commonly performed, as indicated by the user behavior information.

Task data store 112 of server device 102 stores task templates, as may be received from task management applications 114 and 118 and/or as may be generated by task template generator 110. In some examples, task data store 112 stores user tasks and/or task lists (e.g., either as an alternative to or in combination with task data stores 116 and/or 120), thereby enabling cross-device synchronization and task backup capabilities. Thus, request processing engine 108 accesses task lists, tasks, and task templates from task data store 112 when processing requests from client devices 104 and 106.

Figure 2:
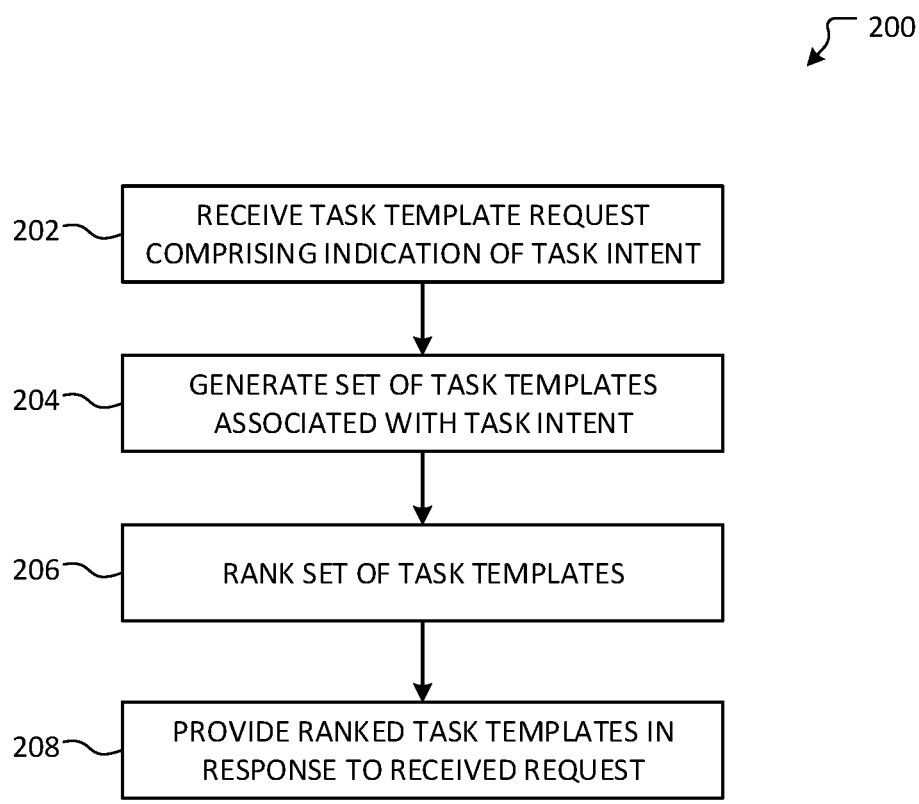
FIG. 2 illustrates an overview of an example method for task template discovery.

FIG. 2 illustrates an overview of an example method 200 for task template discovery according to aspects described herein. In examples, aspects of method 200 are performed by a server, such as server device 102 in FIG. 1. Method 200 begins at operation 202, where a task template request is received. In some examples, the task template request comprises an indication of task intent, such as a task query comprising one or more words or a task category. It will be appreciated that, in other examples, the task template request does not comprise a task intent indication or may instead indicate a request for a curated set of task templates (e.g., trending task templates, most popular task templates, seasonal task templates, etc.). The task template request may be received by a request processing engine, such as request processing engine 108 in FIG. 1.

Flow progresses to operation 204, where a set of task templates associated with the task intent is generated. In examples, generating the set of task templates comprises evaluating one or more tags associated with a task template to determine whether it is related to the task intent. In other examples, a set of keywords, a title or description, and/or information associated with one or more subtasks are evaluated to determine tasks that are associated with the task intent. In examples, a pre-generated set of tasks is accessed based on the task intent. The task templates may be accessed from a task data store, such as task data store 112 of server device 102 in FIG. 1. While example techniques for generating a set of tasks are described, it will be appreciated that other techniques may be used.

At operation 206, the set of task templates are ranked. In examples, ranking the set of task templates comprises evaluating user ratings associated with the templates, the number of times the template has been added to users' task lists, and/or one or more costs associated with each task template, among other ranking criteria. In some examples, the task template request received at operation 202 comprises one or more ranking criteria for ranking the set of task templates. In other examples, aspects of operation 206 may be omitted, such as examples where a pre-generated set of task templates is accessed.

Moving to operation 208, the ranked task templates are provided in response to the received request. In examples, the ranked task templates are provided as a list that is parsed by a client application, such as task management applications 114 or 118 in FIG. 1. In another example, the ranked task templates are provided as part of a web page, as may be processed by a web browser of a client device and presented to a user. Aspects of method 208 may be performed by a request processing engine, such as request processing engine 108 of server device 102 in FIG. 1. Method 200 terminates at operation 208.

Figure 3A:
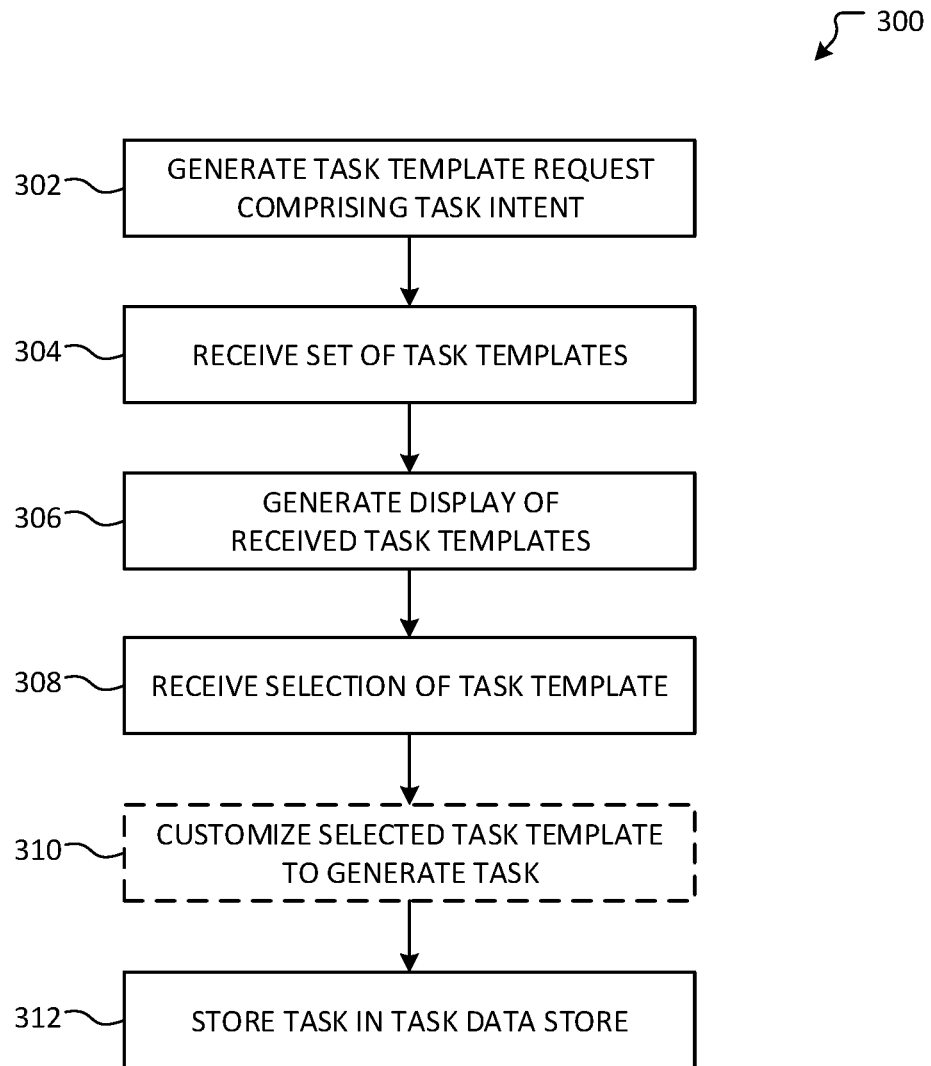
FIG. 3A illustrates an overview of an example method for accessing a task template catalog and generating a task from a task template in a task management application.

FIG. 3A illustrates an overview of an example method 300 for accessing a task template catalog and generating a task from a task template in a task management application. In examples, aspects of method 300 are performed by a client device, such as client device 104 or 106 in FIG. 1. Method 300 begins at operation 302, where a task template request is generated. In examples, the task template request comprises a task intent, such as a task query comprising one or more words or a task category. It will be appreciated that, in other examples, the task template request does not comprise a task intent indication or may instead indicate a request for a curated set of task templates (e.g., trending task templates, most popular task templates, season task templates, etc.).

At operation 304, a set of task templates is received in response to the request generated at operation 302. In examples, the set of task templates is received as a list. For example, the list may be in an Extensible Markup Language (XML) or JavaScript Object Notation (JSON) format that is parsed by an application of the client device (e.g., task management application 114 or 118 of client device 104 or 106 in FIG. 1, respectively). In another example, the set of task templates is received as part of a webpage. It will be appreciated that while example data formats are described herein, the set of task templates may be represented using any of a variety of other techniques.

Flow progresses to operation 306, where a display of the received set of task templates is generated. For example, a task management application (e.g., task management application 114 or 118 of client device 104 or 106 in FIG. 1, respectively) generates a display of the received task templates (e.g., as may have been received using an XML or JSON format), thereby enabling a user to view the task templates and associated information. As another example, a web browser application is used to view the webpage received at operation 304. It will be appreciated that any of a variety of applications and display techniques may be used to present the task templates to a user.

Moving to operation 308, a selection of a task template is received. The selection indicates that the user wishes to generate a task for a task management application. For example, the selection is received as a result of a user tapping or clicking on a task template displayed at operation 306. In some instances, a first selection of the task template is received, thereby indicating that additional detail relating to the task template is requested. As a result, additional detail is displayed (e.g., as may have been received at operation 304 or as may be requested in response to the first selection, among other examples). After viewing the additional detail, the user may select the task template (e.g., the selection received at operation 308) as the template to generate in the task management application.

At operation 310, the selected task template is customized to generate a task. Operation 310 is illustrated using a dashed box to indicate that, in some examples, operation 310 may be omitted. For example, if the task template does not offer any customizations (e.g., it does not comprise any parametric rules, conditional subtasks, etc.), operation 310 may be omitted. In other examples, aspects of the task template are customized based on user input, device information, or any of a variety of other information that may be evaluated at operation 310. In some examples, aspects of the selected task template are left un-customized, such that they may be customized at a later time. For example, this may occur if the user is unsure of requested information or if information requested for the customization process is unavailable.

Flow progresses to operation 312, where the generated task is stored in a task data store. For example, the generated task may be stored in a task data store such as task data store 112, 116, or 118 of server device 102, client device 104, or client device 106 in FIG. 1, respectively. In some examples, the task is associated with a task list of the task management application. Flow terminates at operation 312.

Figure 3B:
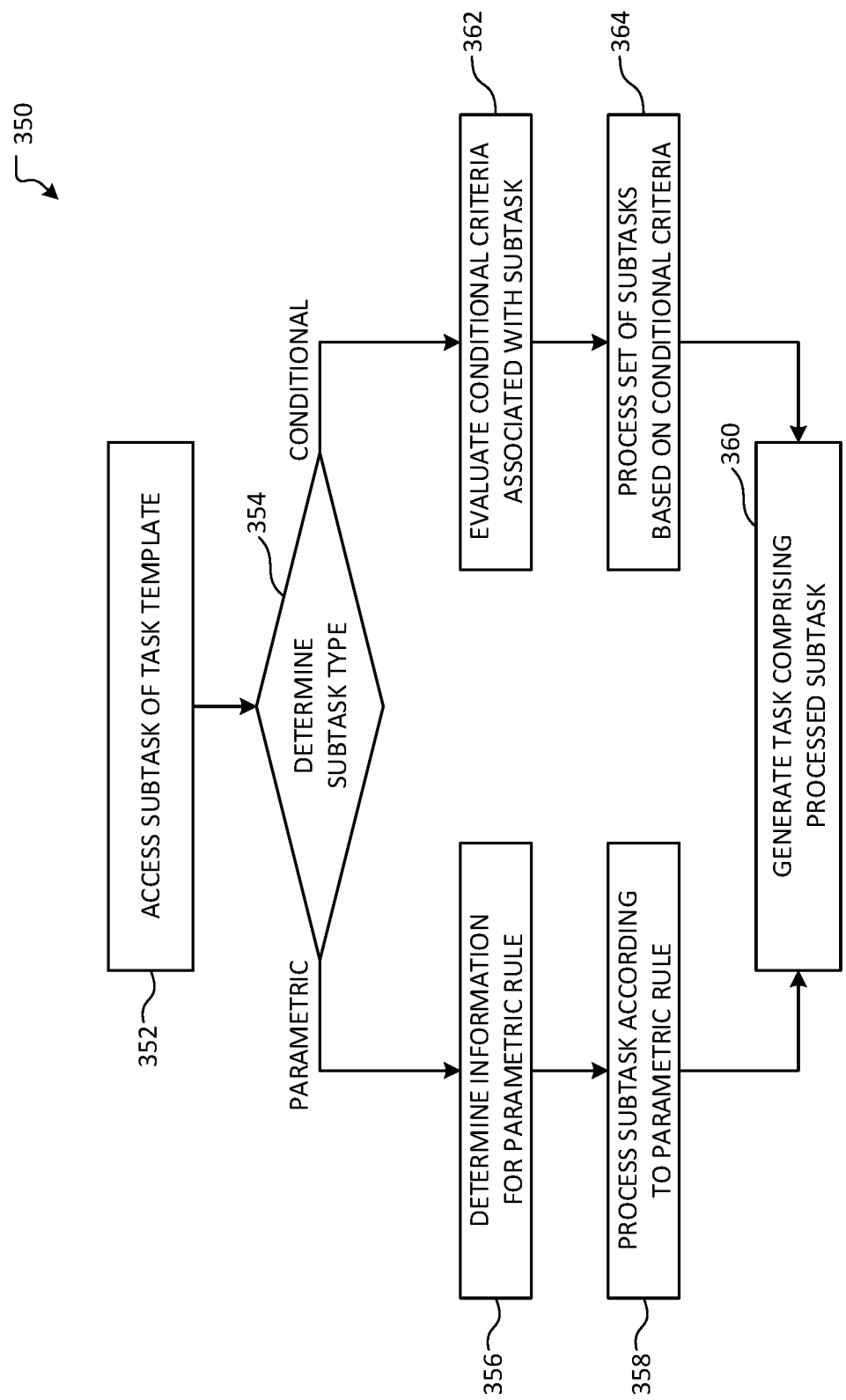
FIG. 3B illustrates an overview of an example method for customizing aspects of a task template.

FIG. 3B illustrates an overview of an example method 350 for customizing aspects of a task template. In examples, aspects of method 350 are performed by a client device, such as client device 104 or 106 in FIG. 1. In other examples, aspects of method 350 are performed as part of operation 310 of method 300, as discussed above with respect to FIG. 3A. Method 350 begins at operation 352, where a subtask of a task template is accessed. In examples, the subtask is accessed from a task data store, such as task data store 112, 116, or 120 in FIG. 1.

At determination 354, a subtask type is determined for the accessed subtask. As illustrated, the subtask is determined to either be "PARAMETRIC" or "CONDITIONAL." It will be appreciated that such subtask types are provided as examples and that, in other examples, additional, alternative, or fewer subtask types may be used. Additionally, operations 356-358 and 362 and 364 are not mutually exclusive. Rather, in some examples, a subtask may be both parametric and conditional.

If, at determination 354, it is determined that the subtask type is parametric, flow branches "PARAMETRIC" to operation 356, where information is determined for at least one parametric rule associated with the subtask. For example, a parametric rule may relate to information received from a user (e.g., a number of people, an amount of time available to perform a task, etc.), device characteristics, information received from a remote computing device, etc. Thus, at operation 356, the information necessary to evaluate the parametric rule is determined. In examples where the parametric rule relates to information received from a user, a prompt is generated to request the information. In other examples, a remote computing device is accessed in order to access the information (e.g., a request to a website, a remote data store, etc.). While example parametric rules and associated information are described herein, it will be appreciated that any of a variety of other rules and information may be used.

At operation 358, the subtask is processed according to the parametric rule. For example, if the parametric rule specifies a scaling factor, aspects of the subtask (e.g., an estimated time, one or more inputs, etc.) are scaled according to the scaling factor using the information determined at operation 356. As another example, the parametric rule may specify a step function is used, wherein the parametric rule is adapted as a result of determining that the determined information exceeds a threshold, is below a threshold, or is within a range, among other examples. It will be appreciated that while example parametric rules are discussed, any of a variety of other rules may be used to adapt a task or subtask according to aspects described herein.

Flow progresses to operation 360, where a task is generated comprising the processed subtask. In examples, the generated task comprises one or more other subtasks that are adapted according to aspects of method 350. In some examples, method 350 is performed to process multiple subtasks according to a parametric rule and/or a conditional rule. Flow terminates at operation 360.

If, however, the determined subtask type at determination 354 is conditional, flow instead branches "CONDITIONAL" to operation 362, where conditional criteria associated with the subtask are evaluated to generate an evaluation result. As an example, information associated with the conditional criteria may be accessed or determined in order to evaluate the conditional criteria. Example conditional criteria include, but are not limited to, completion of another task or subtask, the availability of an input associated with the subtask, a location associated with a computing device of the user (among other device characteristics), and/or a time, date, or season. It will be appreciated that while example conditional criteria are described herein, any of a variety of other conditional criteria may be used.

At operation 364, a set of subtasks is processed based on the criteria and the evaluation result generated at operation 362. For example, the subtask itself may be omitted from the generated task, marked as complete, or modified to incorporate a set of constituent subtasks. As another example, one or more other subtasks may be processed according to the evaluated criteria. In some examples, both the subtask itself and a set of other subtasks are processed at operation 364. Flow then branches to operation 360, which is discussed above, after which flow terminates at operation 360.

Figure 4A:
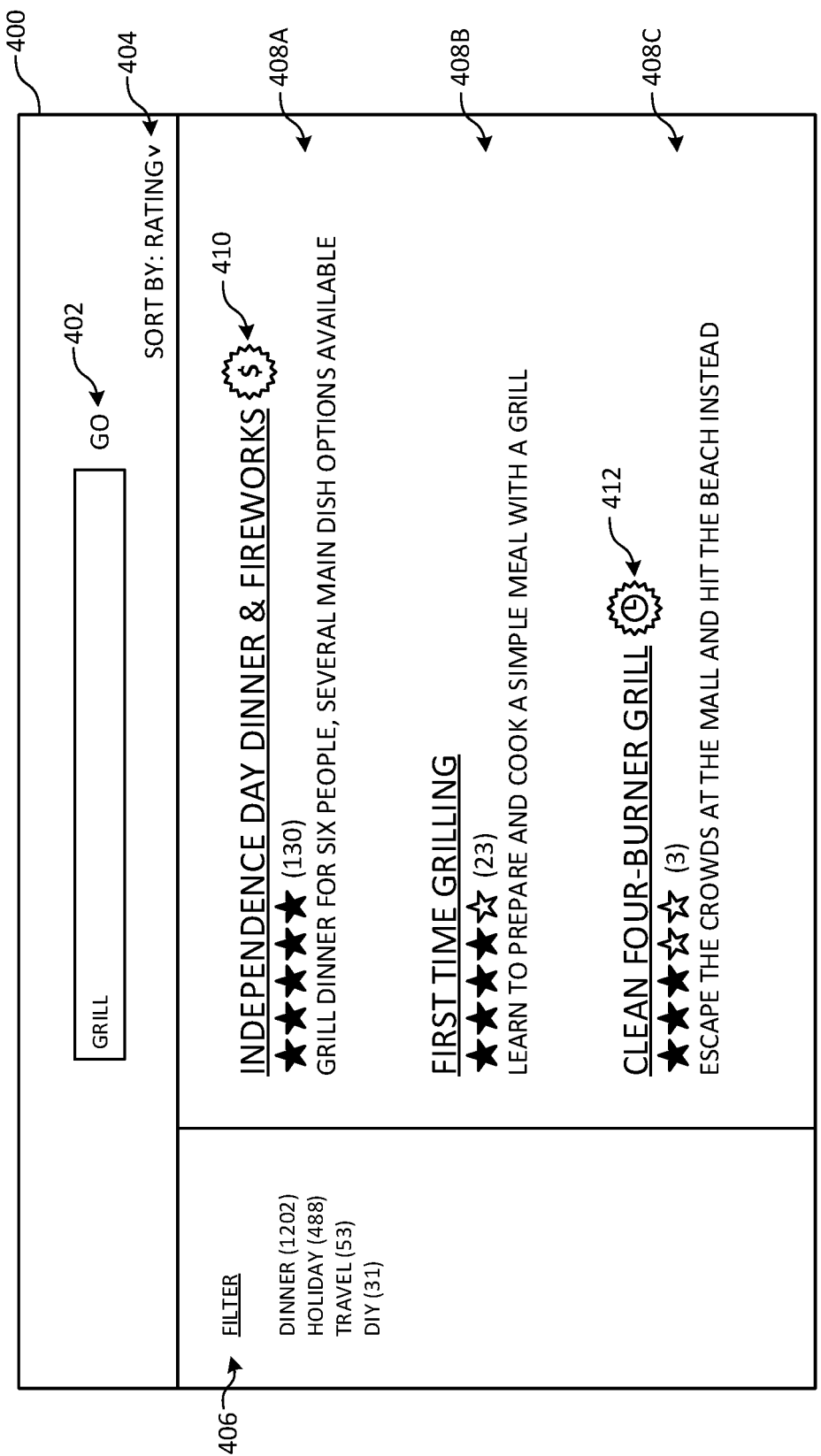
FIGS. 4A-4C illustrate overviews of example user interface features for social task template discovery and customization.
Figure 4B:
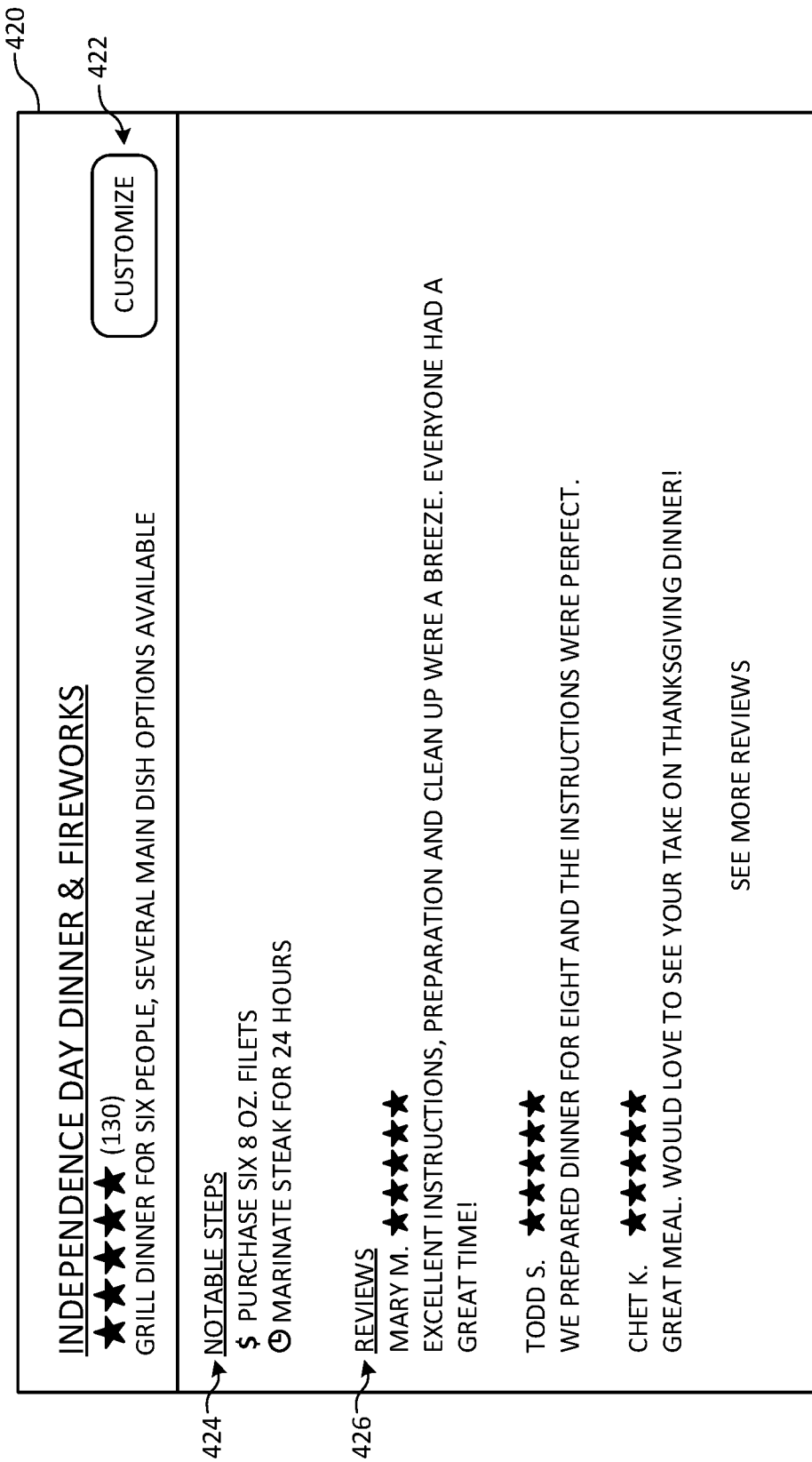
Figure 4C:
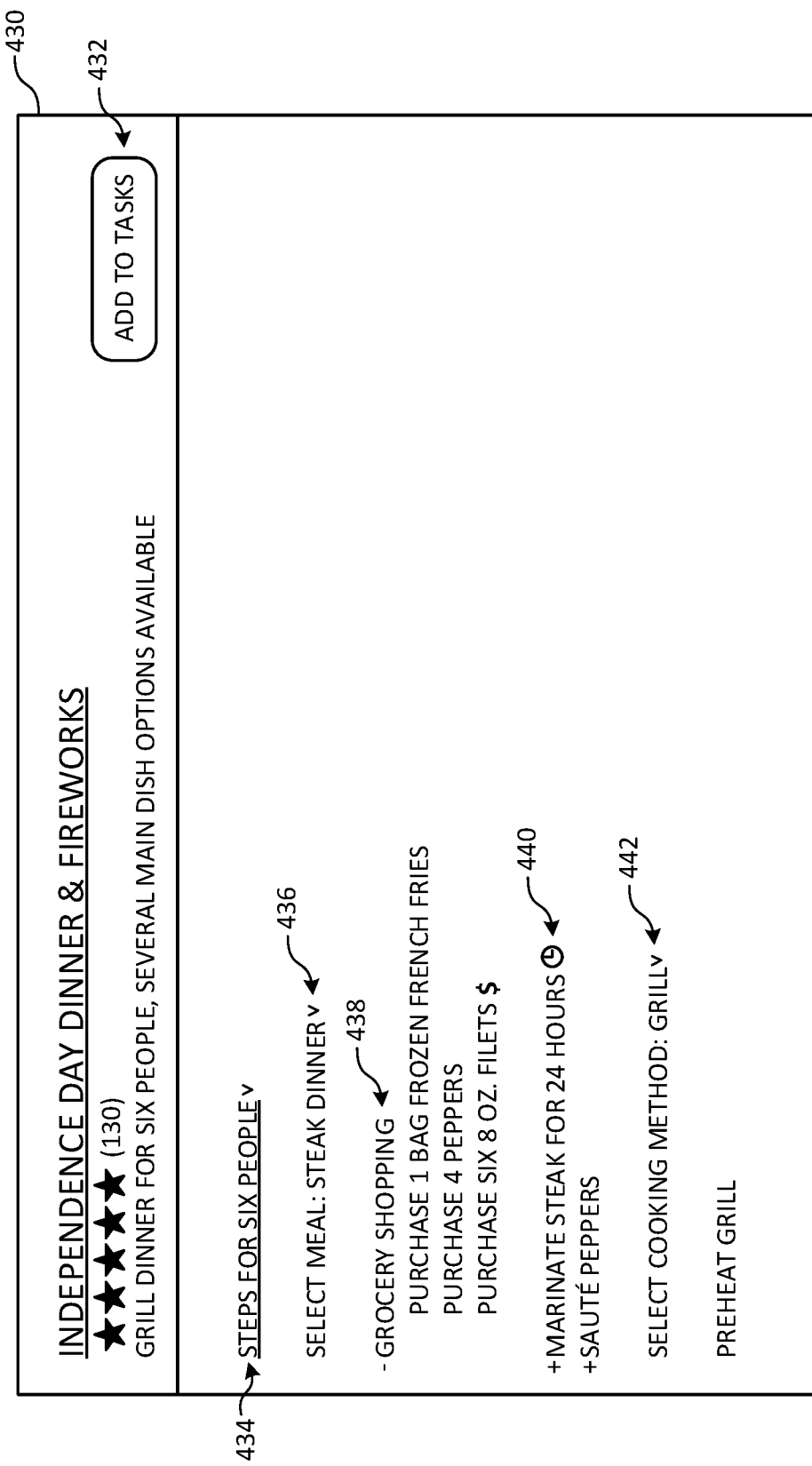

FIGS. 4A-4C illustrate overviews of example user interface features for social task template discovery and customization. In examples, user interface 400 in FIG. 4A is displayed by a client device, such as client device 104 or 106 in FIG. 1. As illustrated, user interface 400 comprises search box 402, sort selector 404, filter pane 406, and results 408A-408C.

In examples, a user inputs a task query into search box 402, which is used to identify task templates associated with the task query. For example, the task query may be communicated to a server device as a task template request, as described above with respect to operations 202 and 302 with respect to FIGS. 2 and 3A, respectively. The displayed task templates may be sorted or according to sorting criteria specified by sort selector 404. In examples, a task template request comprises an indication as to the selected sorting criteria. In another example, a user may select a filter illustrated in filter pane 406 to further refine the task template results displayed in user interface 400.

Results 408A-408C are task templates that were identified to be relevant to the task query in search box 402. In examples, the displayed task templates were identified and ranked according to aspects of method 200 discussed above with respect to FIG. 2. As an example, results 408A-408C are illustrated as having a title (e.g., "INDEPENDENCE DAY DINNER & FIREWORKS"), a rating (e.g., out of five stars and an associated number of reviewers), and a brief description. It will be appreciated that the task template listing illustrated by user interface 400 is provided as an example and that, in other examples, additional, alternative, or different information may be displayed. For example, a monetary cost (e.g., estimated, based on past users, etc.), time required to complete the task, or recommended number of people may be displayed. In examples, information displayed for a given task template may be user customizable based on one or more user preferences.

User interface 400 is further illustrated as comprising cost badge 410 and time badge 412. Badges 410 and 412 are provided to illustrate examples in which certain task templates (e.g., 408A and 408C, respectively) are highlighted for having one or more subtasks that are costly (e.g., monetary cost, time commitment, etc.). In examples, a user may specify a filter to remove such task templates from the displayed results (e.g., altogether, based on a specified threshold, etc.). Similarly, a user preference may indicate a threshold above which such badges should be displayed. It will be appreciated that while example badges 410 and 412 are discussed herein, any of a variety of other badges may be used to indicate task templates with one or more notable subtasks.

FIG. 4B illustrates a task template detail view 420. Certain aspects depicted in FIG. 4B are described above in the context of FIG. 4A and, thus, are not necessarily described further. In examples, task template detail view 420 is displayed to a user as a result of selecting a task template result (e.g., task template result 408A) illustrated in FIG. 4A. As illustrated task template detail view 420 comprises customize button 422, notable steps 424, and reviews 426. In examples, a user actuates customize button. 422 to generate a task for a task management application according to the selected task template. In some examples, if a task template does not offer customization options, customize button 422 may be omitted in favor of a button with which a user can add the task template to the user's task management application.

Notable steps 424 comprises a display of a subset of subtasks from the task template that are notable. As used herein, a task or subtask (or "step," as used in FIG. 4B) is "notable" if it exhibits different attributes as compared to other tasks/subtasks. In some examples, a threshold may be used to evaluate a subtask in order to determine whether the difference is notable (e.g., determined based on an analysis of a set of subtasks for a given task, other tasks performed by a user, etc.). In another example, subtasks may be ranked based on cost, such that the topmost or top two subtasks are determined to be notable. Similar to badges 410 and 412 in FIG. 4A, any of a variety of attributes may be evaluated in order to determine notability in addition to or as an alternative to monetary cost and time required.

Task template detail view 420 further comprises reviews 426. Reviews 426 are reviews left by other users who have used the task template to generate a task in their respective task management applications. In some examples, only users who have completed the task are permitted to review a task template. In other examples, any user is able to leave a review. As illustrated, reviews 426 comprise a star rating, a name, and a review text. It will be appreciated that other information may be presented as an alternative to or in addition to the examples illustrated in FIG. 4B. In some examples, other content types may be used, such as images, audio recordings, and/or videos.

FIG. 4C illustrates a task template customization view 430. Certain aspects depicted in FIG. 4C are described above in the context of FIGS. 4A-4B and, thus, are not necessarily described further. In examples, task template customization view 430 is displayed as a result of a user actuating customize button 422 illustrated in FIG. 4B.

As illustrated, task template customization view 430 comprises add to tasks button 432. Add to tasks button 432 is used to add the task to a task list of a user after the user has customized the task template using elements 434, 436, and 442. In examples, a user is able to customize a task even after adding the task to a task list. In other examples, the task template is added to a user's task list without first being customized. As an example, a task template may comprise a default configuration that a user can customize after adding it to his or her task list. Task template customization view 430 is further illustrated as comprising subtask 438 and subtask 440. Subtask 438 illustrates an expanded subtask with which an additional subset of subtasks is associated (e.g., three different purchasing subtasks), which may be collapsed. For example, subtask 440 is illustrated as an example of a collapsed subtask.

Parametric subtask 434 enables a user to select a different number of people, thereby adapting the task template and associated subtasks to fewer or more people than the initial six people. Accordingly, other subtasks (e.g., subtasks 436-442) may be adapted based on changing the number of people indicated by parametric subtask 434. Subtasks 436 and 442 are illustrated as dropdown menus from which one of multiple options may be selected. In examples, other subtasks may be conditioned on a user selection for each of subtasks 436 and 442. As an example, a different selected meal at subtask 436 may change the ingredients of grocery shopping subtask 438. Similarly, a changed selection at subtask 442 may result in different cooking instructions. Once the user is done customizing the task template, actuating add to tasks button 432 generates a task according to the selected customizations and the task template, thereby adding the generated task to a task list for the user.

FIGS. 5-8 and the associated descriptions provide a discussion of a variety of operating environments in which aspects of the disclosure may be practiced. However, the devices and systems illustrated and discussed with respect to FIGS. 5-8 are for purposes of example and illustration and are not limiting of a vast number of computing device configurations that may be utilized for practicing aspects of the disclosure, described herein.

Figure 5:
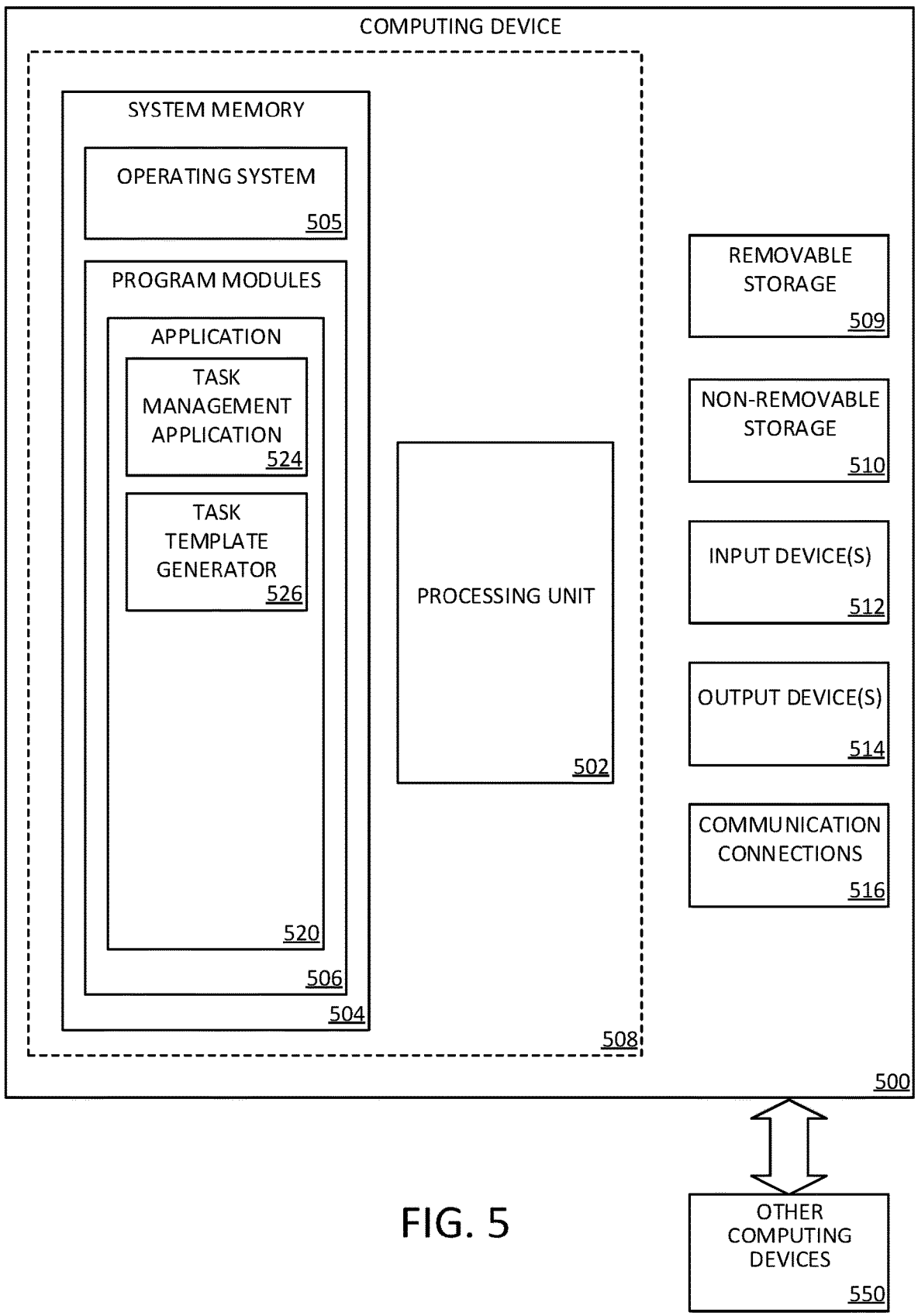
FIG. 5 is a block diagram illustrating example physical components of a computing device with which aspects of the disclosure may be practiced.

FIG. 5 is a block diagram illustrating physical components (e.g., hardware) of a computing device 500 with which aspects of the disclosure may be practiced. The computing device components described below may be suitable for the computing devices described above, including the computing devices 102, 104, and 106 in FIG. 1. In a basic configuration, the computing device 500 may include at least one processing unit 502 and a system memory 504. Depending on the configuration and type of computing device, the system memory 504 may comprise, but is not limited to, volatile storage (e.g., random access memory), non-volatile storage (e.g., read-only memory), flash memory, or any combination of such memories.

The system memory 504 may include an operating system 505 and one or more program modules 506 suitable for running software application 520, such as one or more components supported by the systems described herein. As examples, system memory 504 may store task management application 524 and task template generator 526. The operating system 505, for example, may be suitable for controlling the operation of the computing device 500.

Furthermore, embodiments of the disclosure may be practiced in conjunction with a graphics library, other operating systems, or any other application program and is not limited to any particular application or system. This basic configuration is illustrated in FIG. 5 by those components within a dashed line 508. The computing device 500 may have additional features or functionality. For example, the computing device 500 may also include additional data storage devices (removable and/or non-removable) such as, for example, magnetic disks, optical disks, or tape. Such additional storage is illustrated in FIG. 5 by a removable storage device 509 and a non-removable storage device 510.

As stated above, a number of program modules and data files may be stored in the system memory 504. While executing on the processing unit 502, the program modules 506 (e.g., application 520) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 500 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 500 may also have one or more input device(s) 512 such as a keyboard, a mouse, a pen, a sound or voice input device, a touch or swipe input device, etc. The output device(s) 514 such as a display, speakers, a printer, etc. may also be included. The aforementioned devices are examples and others may be used. The computing device 500 may include one or more communication connections 516 allowing communications with other computing devices 550. Examples of suitable communication connections 516 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. Any such computer storage media may be part of the computing device 500. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 6A:
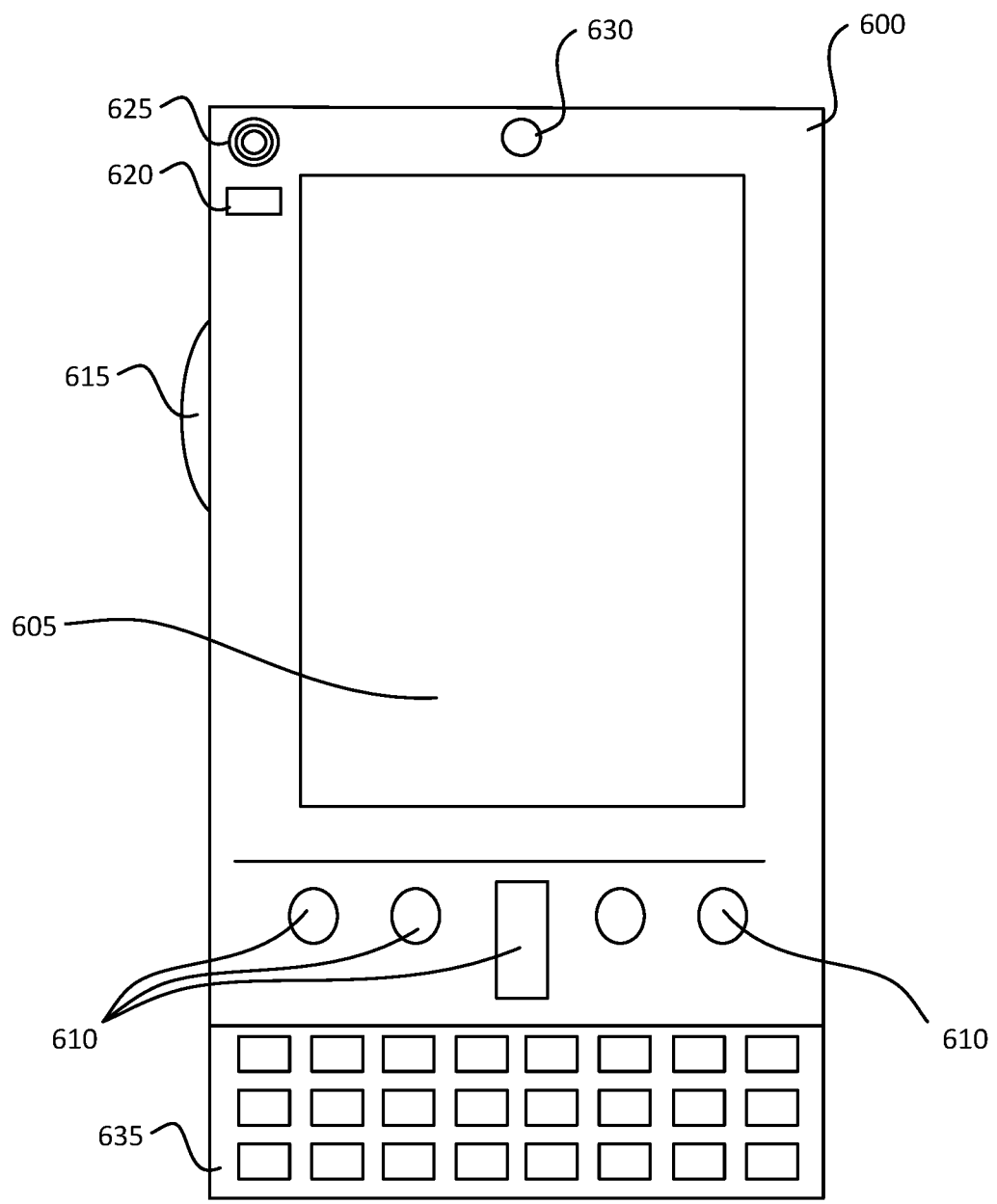
FIGS. 6A and 6B are simplified block diagrams of a mobile computing device with which aspects of the present disclosure may be practiced.
Figure 6B:
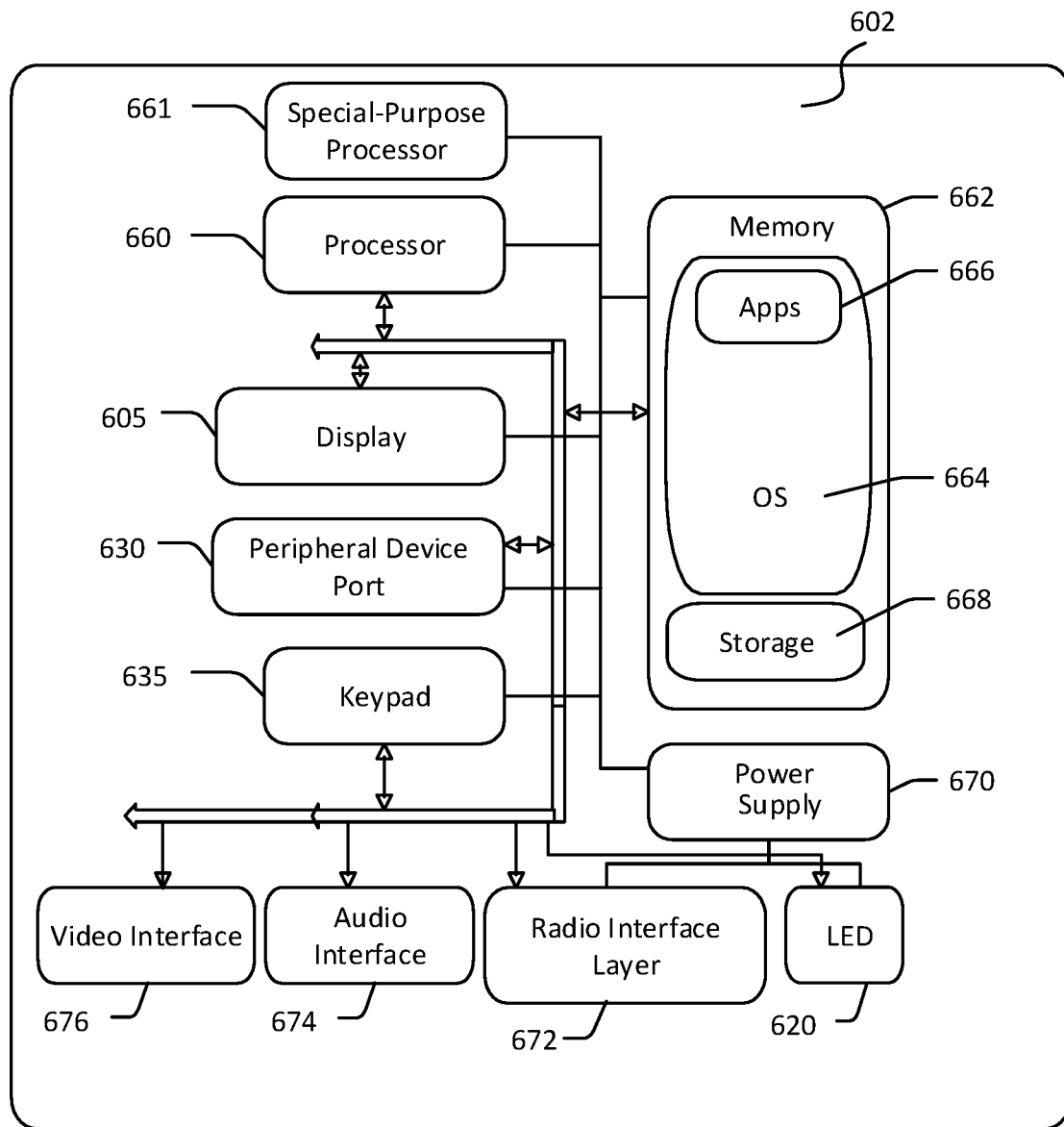

FIGS. 6A and 6B illustrate a mobile computing device 600, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 6A, one aspect of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display).

If included, an optional side input element 615 allows further user input. The side input element 615 may be a rotary switch, a button, or any other type of manual input element. In alternative aspects, mobile computing device 600 may incorporate more or less input elements. For example, the display 605 may not be a touch screen in some embodiments.

In yet another alternative embodiment, the mobile computing device 600 is a portable phone system, such as a cellular phone. The mobile computing device 600 may also include an optional keypad 635. Optional keypad 635 may be a physical keypad or a "soft" keypad generated on the touch screen display.

In various embodiments, the output elements include the display 605 for showing a graphical user interface (GUI), a visual indicator 620 (e.g., a light emitting diode), and/or an audio transducer 625 (e.g., a speaker). In some aspects, the mobile computing device 600 incorporates a vibration transducer for providing the user with tactile feedback. In yet another aspect, the mobile computing device 600 incorporates input and/or output ports, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one aspect of a mobile computing device. That is, the mobile computing device 600 can incorporate a system (e.g., an architecture) 602 to implement some aspects. In one embodiment, the system 602 is implemented as a "smart phone" capable of running one or more applications (e.g., browser, e-mail, calendaring, contact managers, messaging clients, games, and media clients/players). In some aspects, the system 602 is integrated as a computing device, such as an integrated personal digital assistant (PDA) and wireless phone.

One or more application programs 666 may be loaded into the memory 662 and run on or in association with the operating system 664. Examples of the application programs include phone dialer programs, e-mail programs, personal information management (PIM) programs, word processing programs, spreadsheet programs, Internet browser programs, messaging programs, and so forth. The system 602 also includes a non-volatile storage area 668 within the memory 662. The non-volatile storage area 668 may be used to store persistent information that should not be lost if the system 602 is powered down. The application programs 666 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600 described herein (e.g., search engine, extractor module, relevancy ranking module, answer scoring module, etc.).

The system 602 has a power supply 670, which may be implemented as one or more batteries. The power supply 670 might further include an external power source, such as an AC adapter or a powered docking cradle that supplements or recharges the batteries.

The system 602 may also include a radio interface layer 672 that performs the function of transmitting and receiving radio frequency communications. The radio interface layer 672 facilitates wireless connectivity between the system 602 and the "outside world," via a communications carrier or service provider. Transmissions to and from the radio interface layer 672 are conducted under control of the operating system 664. In other words, communications received by the radio interface layer 672 may be disseminated to the application programs 666 via the operating system 664, and vice versa.

The visual indicator 620 may be used to provide visual notifications, and/or an audio interface 674 may be used for producing audible notifications via the audio transducer 625. In the illustrated embodiment, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input, such as to facilitate a telephone conversation. In accordance with embodiments of the present disclosure, the microphone may also serve as an audio sensor to facilitate control of notifications, as will be described below. The system 602 may further include a video interface 676 that enables an operation of an on-board camera 630 to record still images, video stream, and the like.

A mobile computing device 600 implementing the system 602 may have additional features or functionality. For example, the mobile computing device 600 may also include additional data storage devices (removable and/or non-removable) such as, magnetic disks, optical disks, or tape. Such additional storage is illustrated in FIG. 6B by the non-volatile storage area 668.

Data/information generated or captured by the mobile computing device 600 and stored via the system 602 may be stored locally on the mobile computing device 600, as described above, or the data may be stored on any number of storage media that may be accessed by the device via the radio interface layer 672 or via a wired connection between the mobile computing device 600 and a separate computing device associated with the mobile computing device 600, for example, a server computer in a distributed computing network, such as the Internet. As should be appreciated such data/information may be accessed via the mobile computing device 600 via the radio interface layer 672 or via a distributed computing network. Similarly, such data/information may be readily transferred between computing devices for storage and use according to well-known data/information transfer and storage means, including electronic mail and collaborative data/information sharing systems.

Figure 7:
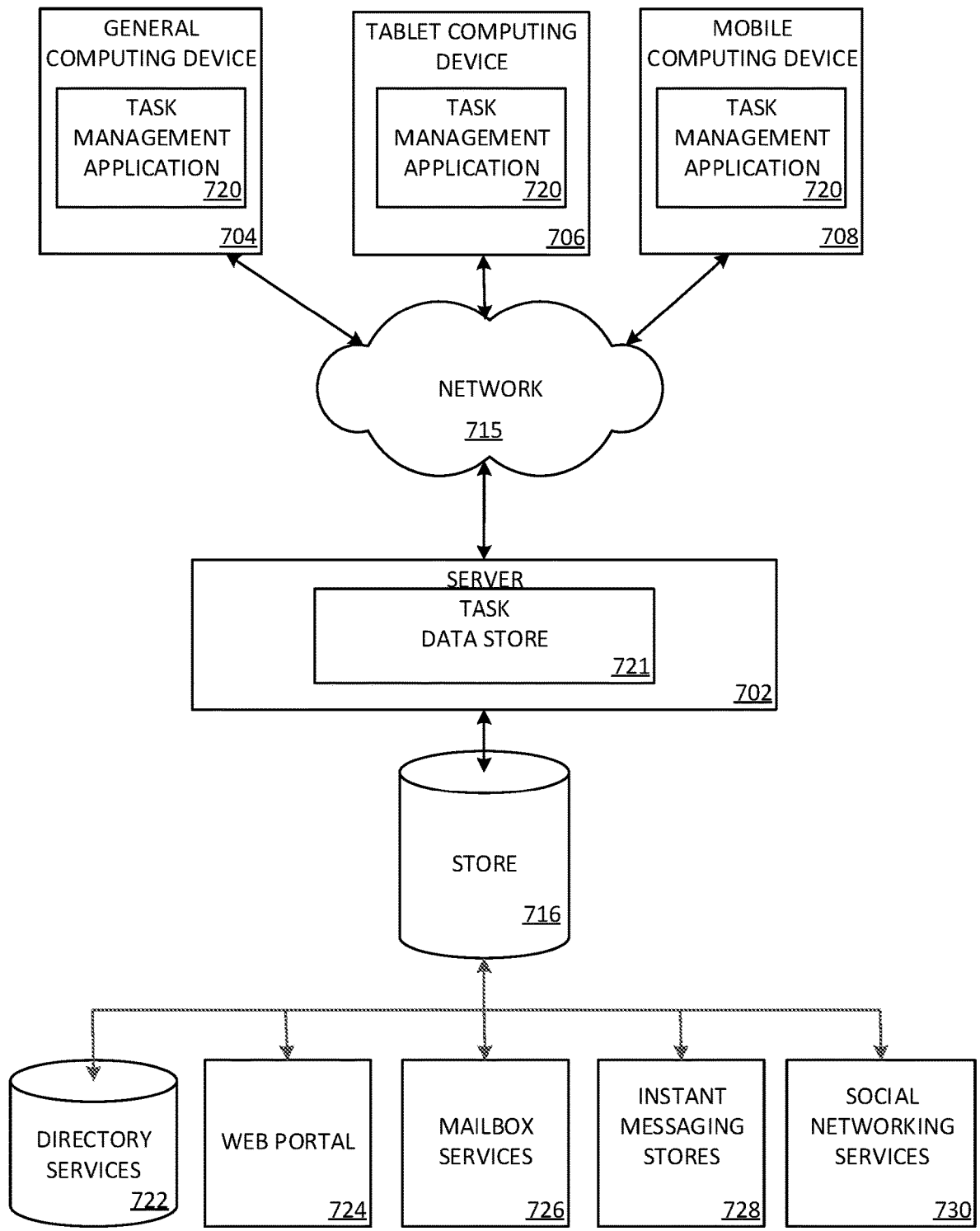
FIG. 7 is a simplified block diagram of a distributed computing system in which aspects of the present disclosure may be practiced.

FIG. 7 illustrates one aspect of the architecture of a system for processing data received at a computing system from a remote source, such as a personal computer 704, tablet computing device 706, or mobile computing device 708, as described above. Content displayed at server device 702 may be stored in different communication channels or other storage types. For example, various documents may be stored using a directory service 722, a web portal 724, a mailbox service 726, an instant messaging store 728, or a social networking site 730.

A task management application 720 may be employed by a client that communicates with server device 702, and/or the task data store 721 may be employed by server device 702. The server device 702 may provide data to and from a client computing device such as a personal computer 704, a tablet computing device 706 and/or a mobile computing device 708 (e.g., a smart phone) through a network 715. By way of example, the computer system described above may be embodied in a personal computer 704, a tablet computing device 706 and/or a mobile computing device 708 (e.g., a smart phone). Any of these embodiments of the computing devices may obtain content from the store 716, in addition to receiving graphical data useable to be either pre-processed at a graphic-originating system, or post-processed at a receiving computing system.

Figure 8:
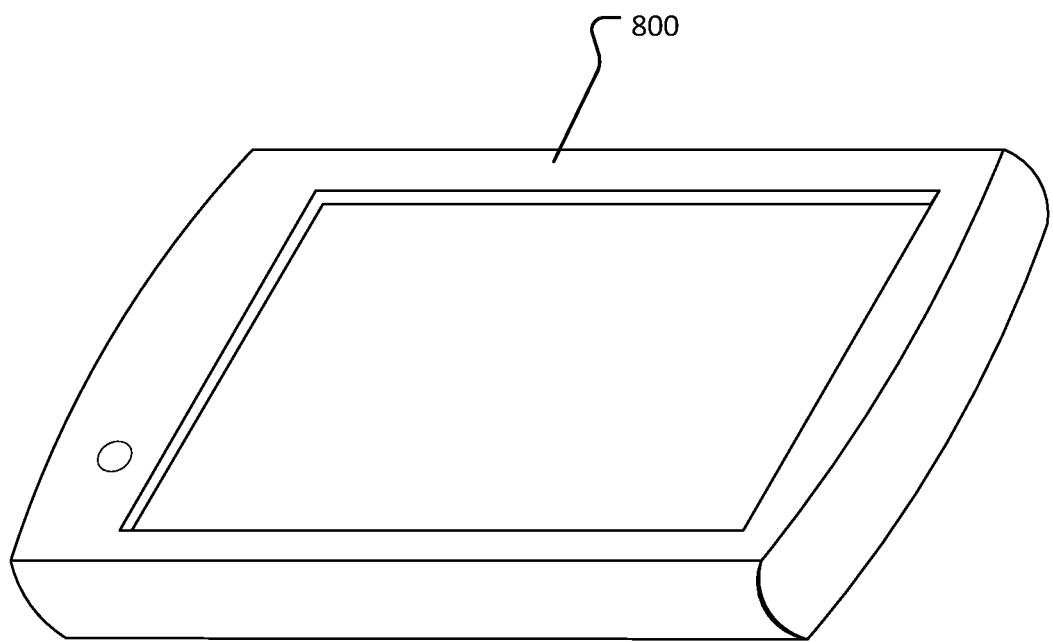
FIG. 8 illustrates a tablet computing device for executing one or more aspects of the present disclosure.

FIG. 8 illustrates an exemplary tablet computing device 800 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

As will be understood from the foregoing disclosure, one aspect of the technology relates to a system comprising: at least one processor; and memory storing instructions that, when executed by the at least one processor, causes the system to perform a set of operations. The set of operations comprises: receiving a set of task templates associated with a task intent; generating a user interface comprising a display of at least a subset of the set of task templates that comprises, for each task template of the subset: a rating associated with the task template; and a description for the task template; and receiving, at the user interface, a selection of a task template. In an example, the set of operations further comprises: in response to the selection of the task template, generating an updated user interface comprising a task template detail view of the selected task template, the task template detail view comprising: a set of reviews for the selected task template; and a set of notable steps for the selected task template. In another example, the task detail view further comprises a customize button for the task template, and wherein the set of operations further comprises: in response to an actuation of the customize button: customizing the selected task template to generate a customized task by performing at least one operation selected from the group consisting of: adapting a subtask of the task template according to at least one parametric rule; or evaluating conditional criteria associated with the subtask to generate an evaluation result; and adding the customized task to a task list for the user in a task management application. In a further example, evaluating conditional criteria associated with the subtask further comprises processing at least one subtask of the selected task template according to the evaluation result. In yet another example, generating the display further comprises associating a badge with at least one of task template, and wherein the badge is at least one of a cost badge or a time badge. In a further still example, the task detail view further comprises an add button for the task template, and the set of operations further comprises: in response to an actuation of the add button: generating, based on the selected task template, a task for the user comprising the customized subtask; and adding the generated task to a task list for the user in a task management application. In an example, the display further comprises a filter pane comprising a set of filters associated with the set of task templates and a sort selector to sort the set of task templates.

In another aspect, the technology relates to a method for providing a task template catalog. The method comprises: receiving, from a computing device, a task template request comprising an indication of a task intent; generating, based on the task intent, a set of task templates from a task data store; generating, using the set of task templates, a ranked set of task templates; and providing, in response to the task template request, the ranked set of task templates. In an example, the method further comprises: receiving, from a first computing device, a first task template; and receiving, from a second computing device, a second task template. In another example, generating the set of task templates comprises adding at least one of the first task template or the second task template to the set of task templates based on the task intent. In a further example, the task template request further comprises ranking criteria, and generating the ranked set of task templates comprises evaluating the ranking criteria. In yet another example, the task data store further comprises a third task template automatically generated from a data source. In a further still example, the task intent indicates a task category, and generating the set of task templates comprises identifying task templates associated with the task category.

In another aspect, the technology relates to a method for customizing a task template from a task template catalog. The method comprises: receiving, from the task catalog, a set of task templates associated with a task intent; generating a user interface comprising a display of at least a part of the set of task templates; receiving, at the user interface, a selection of the task template, wherein the selected task template comprises a set of subtasks; for a subtask of the set of subtasks, customizing the subtask; and generating, based on the selected task template, a task for the user comprising the customized subtask. In an example, the set of task templates is received from the task catalog in response to a task template request, and the task template request comprises the task intent. In another example, customizing the subtask comprises at least one of: adapting the subtask according to at least one parametric rule; or evaluating conditional criteria associated with the subtask to generate an evaluation result. In a further example, evaluating conditional criteria associated with the subtask further comprises processing at least one subtask of the set of subtasks according to the evaluation result. In yet another example, generating the display further comprises associating a badge with at least one of task template, and wherein the badge is at least one of a cost badge or a time badge. In a further still example, the method further comprises: adding the generated task to a task list for the user in a task management application. In an example, the display further comprises a filter pane comprising a set of filters associated with the set of task templates and a sort selector to sort the set of task templates.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
    at least one processor; and
    memory storing instructions that, when executed by the at least one processor, causes the system to perform a set of operations, the set of operations comprising:
        receiving a set of task templates associated with a task intent in a task management application;
        generating a task list in a user interface of the task management application comprising a display of at least the set of task templates and a subset for each task template of the set of task templates;
        receiving, at the user interface, a selection of a task template;
        in response to the selection of the task template, generating an updated user interface comprising a task template detail view of the selected task template, wherein the detail view comprises a customize button for the task template;
        in response to an actuation of the customize button, customizing a task within the selected task template by:
            adding a conditional subtask to the task, wherein the conditional subtask is associated with a conditional criterion;
            evaluating the conditional criterion to generate an evaluation result;
            and processing the conditional subtask according to the evaluation result to generate a customized task; and
        presenting the customized task to be added to the task list for a user in the user interface of the task management application.

2. The system of claim 1, wherein the set of operations further comprises:
    in response to the selection of the task template, generating an updated user interface comprising a task template detail view of the selected task template, the task template detail view comprising:
        a set of reviews for the selected task template; and
        a set of notable steps for the selected task template.

3. The system of claim 1, wherein generating the display further comprises associating a badge with at least one of task template of the set of task templates, and wherein the badge is at least one of a cost badge or a time badge.

4. The system of claim 1, wherein the display further comprises a filter pane comprising a set of filters associated with the set of task templates and a sort selector to sort the set of task templates.

5. The system of claim 1, wherein the conditional criterion comprises one or more of: completion of a second task, completion of a subtask, availability of an input associated with the conditional subtask, a characteristic of a device associated with a user, a time, a date, and a season.

6. The system of claim 1, wherein processing the conditional subtask according to the evaluation result further comprises one of:
    including the conditional subtask in the customized task;
    omitting the conditional subtask from the customized task;
    marking the conditional subtask as complete; and
    modifying the conditional subtask to incorporate a set of constituent subtasks and adding the constituent subtasks to the customized task.

7. A method for customizing a task template from a task template catalog, comprising:
    receiving, from the task catalog, a set of task templates associated with a task intent in a task management application;
    generating a task list in a user interface of the task management application comprising a display of at least the set of task templates and a part for each task template of the set of task templates;
    receiving, at the user interface, a selection of the a task template, wherein the selected task template comprises a task;
    customizing the task within the selected task template by:
        adding a conditional subtask to the task, wherein the conditional subtask is associated with a conditional criterion;
        evaluating the conditional criterion to generate an evaluation result; and
        processing the conditional subtask according to the evaluation result to generate a customized task;
    generating, based on the selected task template, a task for the user comprising the customized task; and
    presenting the customized task to be added to the task list for a user in the user interface of the task management application.

8. The method of claim 7, wherein the set of task templates is received from the task catalog in response to a task template request, and wherein the task template request comprises the task intent.

9. The method of claim 7, wherein generating the display further comprises associating a badge with at least one task template of the set of task templates, and wherein the badge is at least one of a cost badge or a time badge.

10. The method of claim 7, further comprising:
    adding the customized task to a task list for the user in a task management application.

11. The method of claim 7, wherein the display further comprises a filter pane comprising a set of filters associated with the set of task templates and a sort selector to sort the set of task templates.

12. The method of claim 7, wherein the conditional criterion comprises one or more of: completion of a second task, completion of a subtask, availability of an input associated with the conditional subtask, a characteristic of a device associated with a user, a time, a date, and a season.

13. The method of claim 7, wherein processing the conditional subtask according to the evaluation result further comprises one of:
- including the conditional subtask in the customized task;
- omitting the conditional subtask from the customized task;
- marking the conditional subtask as complete; and
- modifying the conditional subtask to incorporate a set of constituent subtasks and adding the constituent subtasks to the customized task.

14. A computer-readable storage media comprising computer-executable instructions, which when executed by a processor, causes the processor to perform a set of operations comprising:
- receiving a set of task templates associated with a task intent in a task management application;
- generating a task list in a user interface of the task management application providing for a display of at least the set of task templates and a subset for each task template of the set of task templates;
- receiving, at the user interface, a selection of a task template;
- in response to the selection of the task template, generating an updated user interface comprising a task template detail view of the selected task template, wherein the detail view comprises a customize button for the task template;
- in response to an actuation of the customize button, customizing a task within the selected task template to by:
  - adding a conditional subtask to the task, wherein the conditional subtask is associated with a condition;
  - evaluating the condition to generate an evaluation result; and
  - processing the conditional subtask according to the evaluation result to generate a customized task; and
- presenting the customized task to be added to the task list for a user in the user interface of the task management application.

15. The computer-readable storage media of claim 14, wherein the set of operations further comprises:
- in response to the selection of the task template, generating an updated user interface comprising a task template detail view of the selected task template, the task template detail view comprising:
  - a set of reviews for the selected task template; and
  - a set of notable steps for the selected task template.

16. The computer-readable storage media of claim 14, wherein generating the display further comprises associating a badge with at least one task template of the set of task templates, and wherein the badge is at least one of a cost badge or a time badge.

17. The computer-readable storage media of claim 14, wherein the display further comprises a filter pane comprising a set of filters associated with the set of task templates and a sort selector to sort the set of task templates.

18. The computer-readable storage media of claim 14, wherein the conditional criterion comprises one or more of: completion of a second task, completion of a subtask, availability of an input associated with the conditional subtask, a characteristic of a device associated with a user, a time, a date, and a season.

19. The computer-readable storage media of claim 14, wherein processing the conditional subtask according to the evaluation result further comprises one of:
- including the conditional subtask in the customized task;
- omitting the conditional subtask from the customized task;
- marking the conditional subtask as complete; and
- modifying the conditional subtask to incorporate a set of constituent subtasks and adding the constituent subtasks to the customized task.

* * * * *